United States Patent [19]
Chen

[11] Patent Number: 4,512,969
[45] Date of Patent: * Apr. 23, 1985

[54] COMPOSITIONS CONTAINING HYDROPHOBIC ADDENDA UNIFORMLY LOADED IN LATEX POLYMER PARTICLES

[75] Inventor: Tsang J. Chen, Rochester, N.Y.

[73] Assignee: Eastman Kodak Company, Rochester, N.Y.

[*] Notice: The portion of the term of this patent subsequent to Dec. 8, 1998 has been disclaimed.

[21] Appl. No.: 382,741

[22] Filed: May 27, 1982

Related U.S. Application Data

[60] Division of Ser. No. 327,528, Dec. 4, 1981, abandoned, which is a continuation of Ser. No. 882,282, Feb. 27, 1978, Pat. No. 4,304,769, which is a division of Ser. No. 778,184, Mar. 16, 1977, abandoned, which is a continuation-in-part of Ser. No. 744,842, Nov. 24, 1976, abandoned, which is a continuation-in-part of Ser. No. 653,816, Jan. 30, 1976, abandoned, which is a continuation-in-part of Ser. No. 575,689, May 8, 1975, abandoned, which is a continuation-in-part of Ser. No. 506,919, Sep. 17, 1974, abandoned.

[51] Int. Cl.$^3$ ............................................. A01K 31/78
[52] U.S. Cl. .................................... 424/81; 424/78; 424/83; 514/132
[58] Field of Search .................. 424/78, 81, 83, 174, 424/218; 260/29.6 MP, 29.6 MQ

[56] References Cited

U.S. PATENT DOCUMENTS

| | | | |
|---|---|---|---|
| 2,772,163 | 11/1956 | Tong | 96/97 |
| 2,801,171 | 7/1957 | Fierke et al. | 96/97 |
| 2,852,386 | 9/1969 | Tong | 96/114 |
| 3,350,265 | 10/1967 | Rubinstein et al. | 424/81 |
| 3,359,102 | 12/1967 | Pattijn et al. | 96/1.8 |
| 3,418,127 | 12/1968 | Millikan | 96/82 |
| 3,518,088 | 6/1970 | Dunn et al. | 96/114 |
| 3,566,874 | 3/1971 | Shepherd et al. | 424/181 |
| 3,619,195 | 11/1971 | Van Campen | 96/100 |
| 3,660,071 | 5/1972 | Gould et al. | 424/81 |
| 3,689,271 | 9/1972 | Nittel et al. | 96/84 |
| 3,725,327 | 4/1973 | Stearns et al. | 260/29.6 MQ |
| 3,736,280 | 5/1973 | Grivas | 260/22 A |
| 3,748,129 | 7/1973 | Autges et al. | 96/3 |
| 3,900,619 | 8/1975 | Lalk et al. | 260/39.6 MQ |
| 3,929,705 | 12/1975 | Minieri | 424/273 |
| 4,057,517 | 11/1977 | Mixen et al. | 260/22 R |

FOREIGN PATENT DOCUMENTS 1265492 3/1972 United Kingdom.

OTHER PUBLICATIONS

Pesticide Index, 4th Edition (1969), p. 285.

Primary Examiner—Leonard Schenkman
Assistant Examiner—Joseph A. Lipovsky
Attorney, Agent, or Firm—Carl O. Thomas

[57] ABSTRACT

This invention is directed to compositions containing loaded particles of from 0.02 to 0.2 micron in average diameter consisting essentially of a loadable polymer. A hydrophobic insecticide, herbicide, miticide, hormone, vitamin, or enzyme is loaded into and distributed through the particles. The weight ratio of the hydrophobic compound to the loadable polymer is from about 1:40 to 3:1.

10 Claims, No Drawings

COMPOSITIONS CONTAINING HYDROPHOBIC ADDENDA UNIFORMLY LOADED IN LATEX POLYMER PARTICLES

This application is a division of U.S. Ser. No. 327,528 filed Dec. 4, 1981, now abandoned, which is a continuation of Ser. No. 882,282, filed Feb. 27, 1978, now U.S. Pat. No. 4,304,769 which is a division of Ser. No. 778,184, filed Mar. 16, 1977, now abandoned, which is a continuation-in-part of Ser. No. 744,842, filed Nov. 24, 1976, now abandoned, which is a continuation-in-part of Ser. No. 653,816, filed Jan. 30, 1976, now abandoned, which is a continuation-in-part of Ser. No. 575,689, filed May 8, 1975, now abandoned, which is a continuation-in-part of Ser. No. 506,919, filed Sept. 17, 1974, now abandoned.

BACKGROUND

The dispersion of hydrophobic addenda in latex polymer particles has been addressed in the photographic arts, as illustrated by Tong U.S. Pat. No. 2,772,163 and Pattijan et al U.S. Pat. No. 3,359,102, and Millikan U.S. Pat. No. 3,418,127.

SUMMARY OF THE INVENTION

In one aspect may invention is directed to a composition containing loaded particles having a mean diameter of from 0.02 to 0.2 micron consisting essentially of a loadable polymer, and, loaded into and distributed through the particles, a hydrophobic insecticide, herbicide, miticide, hormone, vitamin, or enzyme compound, the weight ratio of the hydrophobic compound to the loadable polymer being from about 1:40, optimally 1:3, to 3:1.

BRIEF DESCRIPTION OF THE LOADING PROCEDURE

My above-referenced patent applications disclose novel, valuable processes for manufacturing loaded polymeric latex compositions containing one or more hydrophobic materials uniformly dispersed through polymeric latex particles.

The loaded polymeric latex compositions prepared are polymeric latexes comprised of an aqueous continuous phase and a dispersed or discontinuous phase consisting essentially of loadable polymer particles. Within the loadable polymer particles one or more hydrophobic compounds is distributed or dissolved.

The process of loading (distributing or dissolving) a hydrophobic compound within the loadable polymer particles is accomplished in the following manner:

The hydrophobic compound (or hydrophobe) to be loaded is dissolved in a water-miscible organic solvent, and an aqueous latex consisting essentially of water as a continuous phase and loadable polymer particles as a dispersed phase is then blended into the water-miscible organic solvent containing the hydrophobe. Blending is undertaken so that the hydrophobe remains in solution and the loadable polymer particles remain dispersed. That is, coagulation of either the hydrophobe or the polymer particles is avoided.

By avoiding coagulation of either the hydrophobe or the polymer particles a twop phase system is established in which the continuous phase—the mixture of water-miscible organic solvent and water—constitutes one phase and the polymer particles constitute a second phase. Initially the hydrophobe is entirely within the continuous phase, dissolved within the water-miscible organic solvent. In the two phase system resulting from blending, the hydrophobe is brought into intimate association with both the continuous and the dispersed phases. The hydrophobe is then free to distribute itself between these phases based on its relative solubilities therein. Dilution of the water-miscible organic solvent with water by blending has the effect of reducing the affinity of the hydrophobe for the continuous phase. Thus, the introduction of water has the effect of driving or shifting the equilibrium distribution of the hydrophobe away from the continuous phase and toward the dispersed phase. The presence of water (or an increased amount of water, if some water was initially present in the water-miscible organic solvent) causes the hydrophobe to redistribute itself between the continuous and dispersed phases. In this way a portion of the hydrophobe becomes dispersed or dissolved in the polymer particles, so that the polymer particles are loaded with hydrophobe. This loading procedure requires that the hydrophobe remain dissolved.

In most instances all the water desired to dilute the water-miscible organic solvent and shift the equilibrium distribution of the hydrophobe is present in the aqueous latex during initial blending. Where it is desired to introduce additional water, as where a concentrated latex is employed, additional water can be blended with the loaded latex composition resulting from the initial step of blending. The additional water will have the effect of further reducing the affinity of the hydrophobe for the continuous phase. This will further drive or shift the equilibrium distribution of the hydrophobe away from the continuous phase toward the dispersed phase and will further contribute to loading the polymer particles with hydrophobe.

While blending of water and loadable polymer particles with the water-miscible organic solvent containing hydrophobe dissolved therein results in significant loading of the hydrophobe into the polymer particles, a subtantial portion of the hydrophobe remains in the continuous phase dissolved in the water-miscible organic solvent. Further loading of the hydrophobe into the polymer particles can be achieved by removing water-miscible organic solvent from the continuous phase. This has the effect of further increasing the affinity of the hydrophobe for the dispersed phase. I prefer to remove at least a major portion—in other words, at least about half—of the water-miscible organic solvent. This again drives or shifts the equilibrium distribution of the hydrophobe away from the continuous phase toward the dispersed phase. A still higher proportion of hydrophobe becomes dissolved or dispersed in the polymer particles so that their loading is further increased.

It is unnecessary to practice all of the loading steps indicated above following initial blending and loading. For certain applications the loaded latex composition resulting from initial blending and loading can be used directly. Or the loaded polymer particles can be separated from the continuous phase and used directly.

DETAILED DESCRIPTION OF THE INVENTION

Water-Miscible Organic Solvents

The water-miscible organic solvents useful in the practice of loading are those which
 (a) can be dissolved in (i.e., are "miscible" with distilled wafer at 20° C. to the extent of at least about 20 parts by volume of solvent in 80 parts by volume of water;

(b) have boiling points (at atmospheric pressure) above about −10° C.;

(c) do not detrimentally react chemically with aqueous latexes containing the loadable polymer particles which are useful in the practice of this invention; and (d) do not dissolve more than about 5 weight percent of such loadable polymer particles at 20° C.

Regarding requirement "c" for solvents useful in the practice of this invention, reaction between the solvent and polymer may be possible under certain circumstances, but is believed to be unlikely. Typical non-limiting examples of such useful water-miscible organic solvents are water-miscible alcohols, ketones and amides, (e.g., acetone, ethyl alcohol, methyl alcohol, isopropyl alcohol, dimethylformamide, methyl ethyl ketone), tetrahydrofuran, N-methyl-2-pyrrolidone, dimethylsulfoxide and mixtures thereof. Of these, acetone, dimethylformamide and/or tetrahydrofuran are preferred when the hydrophobic material in question is soluble therein.

Aqueous Latexes

The aqueous latexes which are employed as starting materials in the practice of my invention consist essentially of water as a continuous phase and loadable polymer particles as a dispersed phase. The loadable polymer particles which are useful in the practice of my invention can be chosen from among those which meet the Loadable Polymer Particle Test.

Loadable Polymer Particle Test

At 25° C., the loadable polymer particles being tested must (a) be capable of forming a latex with water at a polymer particle concentration of from 10 to 20 percent by weight, based on total weight of the latex, and (b) when 100 ml of the latex is then mixed with an equal volume of the water-miscible organic solvent to be employed in forming the loaded polymerix latex composition desired, stirred and allowed to stand for 10 minutes, exhibit no observable coagulation of the polymer particles.

It is appreciated that the loadable polymer particles useful in the practice of my invention can be formed by a variety of different loadable polymers. A preferred class of polymers capable of forming loadable polymer particles satisfying the Loadable Polymer Particle Test set forth above are the following polymers which are comprised of repeating units in the proportions indicated:

(a) The repeating units forming from 40 to 98 percent by weight of the preferred class of polymers are derived from one or a mixture in any proportion of the following monomers:

(i) The monomers of this class can be generically designated as ethenic monomers of the formula:

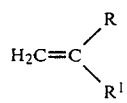
(I)

where
R is hydrogen, halogen or vinyl and
R¹ is hydrogen, halogen or methyl or, when R is hydrogen, cyano.

Specific preferred monomers satisfying Formula I above are isoprene, chloroprene, 1,3-butadiene, propenenitrile, and vinylidene chloride. The use of other conventional polymerization monomers satisfying Formula I, such as vinyl chloride, vinyl fluoride, vinylidene fluoride, ethylene, propylene and the like, is specifically contemplated.

(ii) The monomers of this class can be generically designated as styrene-type monomers of the formula:

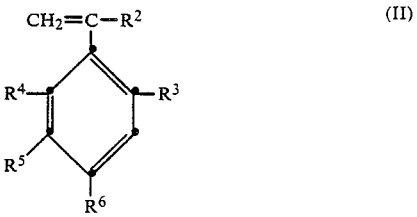
(II)

where
R² is hydrogen or methyl,
R³, R⁴ and R⁶ are hydrogen or lower alkyl of from 1 to 5 carbon atoms,
R⁵ is hydrogen and with R⁴ constitutes the atoms necessary to complete a fused benzene ring or
one of R⁵ and R⁶ is halomethyl.

Exemplary of monomers satisfying Formula II are styrene, o-vinyltoluene, p-vinyltoluene, p-chloromethylstyrene, m-chloromethylstyrene, α-methylstyrene, 2-ethylstyrene, 4-butylstyrene, 4-pentylstyrene, 2-vinylmesitylene and 1-vinylnaphthalene.

(iii) The monomers of this class can be generally designated as esters of 2-alkenoic acids having the formula

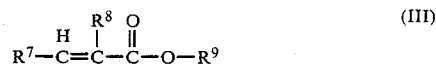
(III)

where
R⁷ is hydrogen or lower alkyl of from 1 to 5 carbon atoms,
R⁸ is hydrogen, chlorine or lower alkyl of from 1 to 5 carbon atoms and
R⁹ is alkyl or haloalkyl having from 1 to 20 carbon atoms.

In a preferred form R⁷ is hydrogen and R⁸ is hydrogen or methyl, so that the esters are formed from acrylic or methacrylic acid. In this preferred form R⁹ contains from one to five carbon atoms. The preferred esters of 2-alkenoic acids are then lower alkyl esters of acrylic and methacrylic acid, such as methyl, ethyl, propyl, iso-propyl, butyl, iso-butyl, tert-butyl, pentyl, neo-pentyl and similar esters of acrylic and methacrylic acid. The use of other esters of 2-alkenoic acids as defined by Formula III is specifically contemplated. In addition to esters of acrylic and methacrylic acid, esters of acids such as α-ethylacrylic acid, α-propylacrylic acid, α-butylacrylic acid, α-pentylacrylic acid, 2-butenoic acid, 2-methyl-2-butenoic acid, 2-nexenoic acid, 2-octenoic acid, 2-methyl-2-octenoic acid and similar acids are specifically contemplated. In addition to the lower alkyl esters, hexyl, heptyl, octyl, undecyl, dodecyl, tetradecyl, hexadecyl, octadecyl, eicosyl and isomeric branched chain esters of the above-noted 2-alkenoic acids are specifically contemplated.

(iv) The repeating units of this class can be formed in whole or in part by vinyl acetate.

As was indicated above, the repeating units of this class (a) can make up the entire polymer or as little as 40 percent by weight of the polymer. In the preferred form the repeating units of this class form from 60 to 95 percent by weight of the loadable polymer. The remaining portion of the polymer is made up of repeating units which, with the exception of the acrylamide repeating units (c), have as their purpose to modify the properties of the polymer, as is indicated below.

(b) The repeating units of this class form from 0 to 25 percent by weight of the preferred class of polymers. The monomers of this class are hydrophilic ethenic monomers having a molecular weight of at most about 300 capable of forming a water soluble homopolymer. The monomers typically incorporate an acid, ammonium or hydroxy solubilizing group. In a specific preferred form the hydrophilic ethenic monomers forming the repeating units of this class are those having a molecular weight of less than 300 of the following formula:

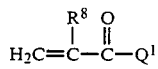  (IV)

where $R^8$ is as defined above;

$Q^1$ is —OM or an organic radical which together with the carbonyl group of the formula forms an ester or amide group terminating in a hydroxy, quaternary ammonium, COOM or SO$_3$M solubilizing group; and M is hydrogen, ammonium or alkali metal. Exemplary monomers of this type are disclosed, for example, in U.S. Pat. Nos. 2,933,734 (issued Feb. 2, 1960); 3,024,221 (issued Mar. 6, 1962); 3,411,911 (issued Nov. 19, 1968) and 3,506,707 (issued Apr. 14, 1970). Specific exemplary hydrophilic ethenic monomers useful in the practice of this invention include the following:

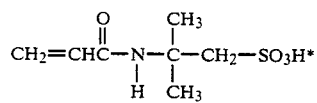 (b-1)

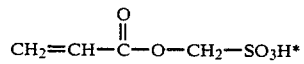 (b-2)

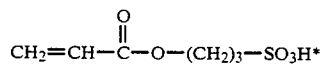 (b-3)

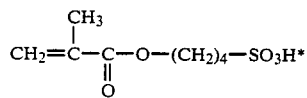 (b-4)

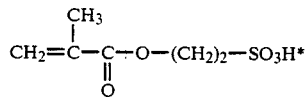 (b-5)

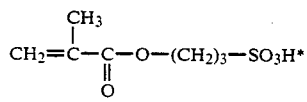 (b-6)

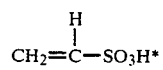 (b-7)

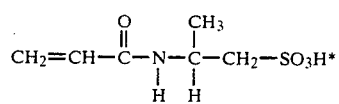 (b-8)

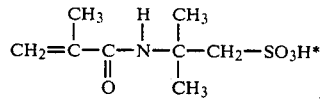 (b-9)

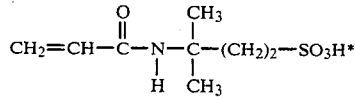 (b-10)

| | |
|---|---|
| p-styrene sulfonic acid* | (b-11) |
| 2-(methacryloyloxy)ethyltrimethylammonium methosulfate | (b-12) |
| acrylic acid* | (b-13) |
| methacrylic acid* | (b-14) |

(*In place of the acidic hydrogen can be an alkali metal cation, preferably Na or K, or an ammonium ion.)

(c) The repeating units of this class form from 0 to 30 percent by weight of the preferred class of polymers. These repeating units are derived from acrylamide monomers of the following formula:

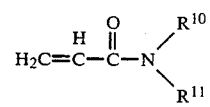 (V)

where $R^{10}$ and $R^{11}$ are hydrogen or alkyl or haloalkyl substituents having from 1 to 5 carbon atoms.

Specifically preferred acrylamide monomers according to Formula V are acrylamide, N-methylacrylamide, N,N-dimethylacrylamide, N-iso-propylacrylamide, N-butylacrylamide and N-pentylacrylamide. N-haloalkyl acrylamides are specifically contemplated such as, for example, N-chloromethylacrylamide, N-(4-chlorobutyl)acrylamide, N-(2,2-dichloroethyl)acrylamide, N-bromomethylacrylamide and the like.

The quantity of repeating units derived from acrylamide monomers is limited to maintain the desirable loading properties of the preferred class of polymers. Excessive amounts of acrylamide monomers can lead to excessive hydrophilic characteristics in the polymers. Accordingly, where polymers are employed containing repeating units derived from higher proportions of acrylamide monomers, their suitability is confirmed by applying the Loadable Polymer Particle Test.

(d) The repeating units of this class form from 0 to 60 percent by weight of the preferred class of polymers. The repeating units of this class are derived from hardenable (i.e. crosslinkable after polymerization) ethenic monomers having a molecular weight of at most about 300. In a preferred form the repeating units of this class can be formed by one or more hardenable ethenic monomers which contain one or more groups which can be crosslinked after polymerization by reaction with a photographic hardener, such as an aldehydic hardener (e.g. formaldehyde or succinaldehyde), a mucohalic acid hardener, a triazine chloride hardener, a vinyl sulfone hardener (e.g. bis(vinylsulfonylmethyl)ether, bis(vinylsulfonyl)methane, etc.), an aziridine hardener and the like.

The repeating units of this class perform the function of rendering the preferred class of polymers hardenable after polymerization has occurred, typically after loading of the polymer particles. Hardening of the polymer particles can serve to regulate the release of loaded hydrophobes and improve the abrasion resistance of the polymer particles. Hardening after loading of the polymer particles is, of course, advantageous in that the rate at which the hydrophobe is introduced is not limited, as occurs if the polymer particles are formed of initially crosslinked polymers. Thus, the rates of loading and release of hydrophobe can be independently adjusted through hardening. I generally prefer that from 0.2 to 10 percent by weight of the preferred class of polymer be formed of the hardenable repeating units.

A specific preferred class of monomers capable of forming hardenable repeating units are those monomers which contain both vinyl unsaturation and active methylene groups. The active methylene groups serve as hardening sites. In one specific form the active methylene group takes the form of a methylene group linking two carbonyl groups or a carbonyl and a cyano group. A specific preferred monomer of this type can be generically designated by the following formula:

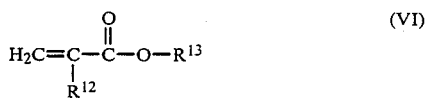

(VI)

where $R^{12}$ is hydrogen, alkyl having from 1 to 12 carbon atoms or

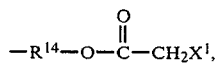

$R^{13}$ is alkyl having from 1 to 10 carbon atoms, cycloalkyl having from 3 to 10 carbon atoms, phenyl or

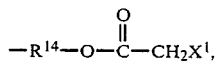

$R^{14}$ is alkylene having from 1 to 10 carbon atoms and $X^1$ is cyano or alkylcarbonyl having from 1 to 8 carbon atoms, provided that one and only one of $R^{12}$ and $R^{13}$ is always

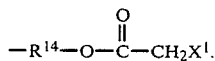

Specific exemplary monomers of this type are disclosed in U.S. Pat. Nos. 3,459,790 (issued Aug. 5, 1969); 3,488,708 (issued Jan. 6, 1970) and 3,554,987 (issued Jan. 12, 1971). Examples of such preferred hardenable ethenic monomers include:

(d-1) N-allylcyanoacetamide,
(d-2) ethyl methacryloylacetoacetate,
(d-3) N-cyanoacetyl-N'-methacryloylhydrazine,
(d-4) 2-acetoacetoxyethyl methacrylate,
(d-5) N-(3-methylacryloyloxypropyl)cyanoacetamide,
(d-6) 2-cyanoacetoxyethyl methacrylate,
(d-7) N-(2-methacryloyloxyethyl)cyanoacetamide,
(d-8) ethyl alpha-acetoacetoxymethylacrylate,
(d-9) 2-acetoacetoxypropyl methacrylate,
(d-10) 3-acetoacetoxy-2,2-dimethylpropyl methacrylate,
(d-11) N-(methacryloyloxymethyl)acetoacetamide,
(d-12) N-t-butyl-N-(methacryloyloxyethyl)acetoacetamide,
(d-13) 2-acetoacetoxyethyl acrylate and
(d-14) 2-acetoacetoxy-2-methylpropyl methacrylate.

(e) The repeating units of this class form from 0 to 5 percent by weight of the preferred class of polymers. These repeating units are derived from crosslinking monomers. Specifically, these repeating units are typically formed by monomers containing at least two independently polymerizable, usually nonconjugated, vinyl groups. These repeating units can be incorporated into the preferred class of polymers for increasing their hydrophobicity; reducing their tendency to swell, in aqueous solutions, at elevated temperatures or when brought into contact with the water-miscible organic solvents; reducing any tendency of the polymer particles to agglomerate or coagulate; improving the abrasion resistance of polymer particles and/or regulating the loading of the polymer particles. It is generally preferred that from 0.2 to 3 percent by weight of the preferred class of polymers be derived from the crosslinking monomers. It is recognized that the cross-linking monomers of this class of repeating units can be employed independently of the repeating units (d). Taking into account the similarities in the repeating units (d) and (e), it is apparent that the crosslinking achieved by these units can be achieved by one or a combination of these repeating units used as alternatives or in combination. The repeating units of this class differ from those of class (d) above in that they cause crosslinking to occur concurrently with polymerization.

Suitable examples of monomers from which the repeating units (e) are formed are divinylbenzene, allyl acrylate, allyl methacrylate, N-allylmethacrylamide, 4,4'-isopropylidenediphenyl diacrylate, 1,3-butylene diacrylate, 1,3-butylene dimethacrylate, 1,4-cyclohexylene-dimethylene dimethacrylate, ethylene glycol dimethacrylate, diisopropylene glycol dimethacrylate, divinyloxymethane, ethylene diacrylate, ethylidene diacrylate, propylidene dimethacrylate, 1,6-diacrylamidohexane, 1,6-hexamethylene diacrylate, 1,6-hexamethylene dimethacrylate, N,N'-methylenebisacrylamide, neopentyl glycol dimethacrylate, phenylethylene dimethacrylate, tetraethylene glycol dimethacrylate, tetramethylene diacrylate, tetramethylene dimethacrylate, 2,2,2-trichloroethylidene dimethacrylate, triethylene glycol diacrylate, triethylene glycol dimethacrylate, ethylidyne trimethacrylate, propylidyne triacrylate, vinyl allyloxyacetate, vinyl methacrylate, 1-vinyloxy-2-allyloxyethane, and the like. Divinylbenzene and ethylene glycol dimethacrylate are particularly preferred monomers.

The loadable polymer particles exhibit an average diameter in the range of from 0.02 to 0.2 micron, preferably in the range of from about 0.02 to 0.08 micron. (Although some swelling can occur during loading, the loaded polymeric latex particles also typically and preferably fall within these same ranges of average diameters.) The loadable polymer particles form at least 2 percent by weight of the aqueous latex and preferably form at least 10 percent by weight thereof. Preferably the aqueous latex contains about 20 percent by weight or less of the loadable polymer particles.

Procedures for producing aqueous latexes useful as starting materials in the practice of my process will be readily apparent to those skilled in the art and do not form a part of my invention. The aqueous latexes employed in the practice of my process can be formed, for example, using conventional free radical polymerization techniques for forming organic polymer hydrosols. Typically the aqueous latex with the polymer particles distributed therein can be conveniently formed by charging into water various monomers necessary to form the desired loadable polymer together with minor amounts of ingredients such as polymerization initiators, surfactants to disperse the monomers, etc. The proportions in which the monomers are employed will determine approximately the proportions of the repeating units in the resulting loadable polymers. More exact control of the proportions of repeating units in the resulting loadable polymers can be achieved by taking into account the known differences in the polymerization rates of the monomers. The proportions of the repeating units in the preferred class of loadable polymers discussed above can be taken alternately as the proportions of the monomers to be introduced for polymerization, since the differences in proportions introduced by this variance are not significant for the purposes of this process. Upon polymerization, the desired aqueous latex with the loadable polymer particles dispersed in an aqueous continuous phase is produced. The latex composition produced can be used directly as the aqueous latex employed in the practice of my process or, optionally, any minor amounts of materials other than water and loadable polymer particles which may be present can be at least partially separated from the aqueous latex by conventional techniques. Exemplary of useful free radical polymerization techniques which can be employed in forming the aqueous latexes are those described in U.S. Pat. Nos. 2,914,499; 3,033,833; 3,547,899 and Canadian Pat. No. 704,778. A preferred method for manufacturing the aqueous latexes useful in the practice of this process is described below, preceding the Example.

Illustrative of aqueous latexes containing loadable polymer particles useful in the practice of my process are those set forth below. The proportions of the monomers reacted to form the loadable polymers are given in terms of the relative proportions of the monomers when introduced into the polymerization vessel. The proportion of the continuous phase, consisting essentially of water, not separately listed, can be anywhere within the preferred range of from 80 to 90 percent by weight, since even broader variations in the proportion of the continuous phase have little observable effect on the utility of the aqueous latexes in practicing my process.

L-1 Poly(sec-Butyl acrylate-co-3-Acryloyloxypropane-1-sulfonic acid, sodium salt-co-2-Acetoacetoxyethyl methacrylate) (85/10/5)

L-2 Poly(Ethyl acrylate-co-3-Acryloyloxypropane-1-sulfonic acid, sodium salt-co-2-Acetoacetoxyethyl methacrylate) (85/10/5)

L-3 Poly(Methyl acrylate-co-3-Acryloyloxypropane-1-sulfonic acid, sodium salt-co-2-Acetoacetoxyethyl methacrylate) (85/10/5)

L-4 Poly(n-Butyl acrylate-co-3-Acryloyloxypropane-1-sulfonic acid, sodium salt-co-2-Acetoacetoxyethyl methacrylate) (85/10/5)

L-5 Poly(Isobutyl acrylate-co-3-Acryloyloxypropane-1-sulfonic acid, sodium salt-co-2-Acetoacetoxyethyl methacrylate) (85/10/5)

L-6 Poly(Vinyl acetate-co-3-Acryloyloxypropane-1-sulfonic acid, sodium salt-co-2-Acetoacetoxyethyl methacrylate) (85/10/5)

L-7 Poly(n-Butyl methhacrylate-co-3-Methacryloyloxypropane-1-sulfonic acid, sodium salt) (90/10)

L-8 Poly(n-Butyl acrylate-co-3-Methacryloyloxypropane-1-sulfonic acid, sodium salt) (85/15)

L-9 Poly(n-Butyl acrylate-co-3-Methacryloyloxypropane-1-sulfonic acid, sodium salt) (80/20)

L-10 Poly(Methyl acrylate-co-3-Methacryloyloxypropane-1-sulfonic acid, sodium salt) (80/20)

L-11 Poly(n-Butyl acrylate-co-3-Methacryloyloxypropane-1-sulfonic acid, sodium salt-co-2-Acetoacetoxyethyl methacrylate) (85/10/5)

L-12 Poly(n-Butyl acrylate-co-3-Methacryloyloxypropane-1-sulfonic acid, sodium salt-co-2-Acetoacetoxyethyl methacrylate) (80/15/5)

L-13 Poly(Ethyl acrylate-co-3-Methacryloyloxypropane-1-sulfonic acid, sodium salt-co-2-Acetoacetoxyethyl methacrylate) (85/10/5)

L-14 Poly(Isobutyl acrylate-co-3-Methacryloyloxypropane-1-sulfonic acid, sodium salt-co-2-Acetoacetoxyethyl methacrylate) (85/10/5)

L-15 Poly(sec-Butyl acrylate-co-3-Methacryloyloxypropane-1-sulfonic acid, sodium salt-co-2-Acetoacetoxyethyl methacrylate) (85/10/5)

L-16 Poly(n-Butyl methacrylate-co-3-Methacryloyloxypropane-1-sulfonic acid, sodium salt-co-3-Acetoacetoxyethyl methacrylate) (85/10/5)

L-17 Poly(n-Butyl methacrylate-co-3-Methacryloxypropane-1-sulfonic acid, sodium salt-co-Acrylic acid) (80/10/10)

L-18 Poly(n-Butyl methacrylate-co-3-Methacryloyloxypropane-1-sulfonic acid, sodium salt-co-2-Acetoacetoxyethyl methacrylate) (90/5/5)

L-19 Poly(Methyl methacrylate-co-3-Methacryloyloxypropane-1-sulfonic acid, sodium salt-co-2-Acetoacetoxyethyl methacrylate) (85/10/5)

L-20 Poly(n-Butyl acrylate-co-Methyl methacrylate-co-3-Methacryloyloxypropane-1-sulfonic acid, sodium salt-co-2-Acetoacetoxyethyl methacrylate) (55/30/10/5)

L-21 Poly(n-Butyl methacrylate-co-Methyl methacrylate-co-3-Methacryloyloxypropane-1-sulfonic acid, sodium salt-co-2-Acetoacetoxyethyl methacrylate) (70/15/10/5)

L-22 Poly(n-Butyl acrylate-co-2-Ethylhexyl acrylate-co-3-Methacryloyloxypropane-1-sulfonic acid, sodium salt-co-2-Acetoacetoxyethyl methacrylate) (60/25/10/5)

L-23 Poly(n-Butyl acrylate-co-n-Butyl methacrylate-co-3-Methacryloyloxypropane-1-sulfonic acid, sodium salt-co-2-Acetoacetoxyethyl methacrylate) (40/45/10/5)

L-24 Poly(Methyl acrylate-co-3-Methacryloyloxypropane-1-sulfonic acid, sodium salt-co-2-Acetoacetoxyethyl methacrylate) (85/10/5)

L-25 Poly(n-Butyl acrylate-co-3-Methacryloyloxypropane-1-sulfonic acid, sodium salt-co-2-Acrylamido-2-methylpropane sulfonic acid) (70/20/10)

L-26 Poly(n-Butyl acrylate-co-2-Acrylamido-2-methylpropane sulfonic acid) (97.5/2.5)

L-27 Poly(n-Butyl acrylate-co-2-Acrylamido-2-methylpropane sulfonic acid) (95/5)

L-28 Poly(n-Butyl acrylate-co-2-Acrylamido-2-methylpropane sulfonic acid) (90/10)

L-29 Poly(n-Butyl acrylate-co-2-Acrylamido-2-methylpropane sulfonic acid) (85/15)

L-30 Poly(n-Butyl acrylate-co-2-Acrylamido-2-methylpropane sulfonic acid) (80/20)

L-31 Poly(n-Butyl methacrylate-co-2-Acrylamido-2-methylpropane sulfonic acid) (90/10)

L-32 Poly(Styrene-co-2-Acrylamido-2-methylpropane sulfonic acid) (90/10)

L-33 Poly(Vinyl acetate-co-2-Acrylamido-2-methylpropane sulfonic acid) (90/10)

L-34 Poly(n-Butyl methacrylate-co-2-Acrylamido-2-methylpropane sulfonic acid-co-Acrylic Acid) (80/10/10)

L-35 Poly(n-Butyl methacrylate-co-2-Acrylamido-2-methylpropane sulfonic acid-co-Divinyl benzene) (88/10/2)

L-36 Poly(n-Butyl acrylate-co-Styrene-co-2-Acrylamido-2-methylpropane sulfonic acid) (30/65/5)

L-37 Poly(n-Butyl acrylate-co-Vinylidene chloride-co-2-Acrylamido-2-methylpropane sulfonic acid) (50/45/5)

L-38 Poly(Styrene-co-Methyl methacrylate-co-2-Acrylamido-2-methylpropane sulfonic acid) (45/45/10)

L-39 Poly(n-Butyl methacrylate-co-2-Acrylamido-2-methylpropane sulfonic acid-co-2-Acetoacetoxyethyl methacrylate) (85/10/5)

L-40 Poly(n-Butyl methacrylate-co-Styrene-co-2-Acrylamido-2-methylpropane sulfonic acid) (50/40/10)

L-41 Poly(Ethyl acrylate-co-2-Acrylamido-2-methylpropane sulfonic acid-co-2-Acetoacetoxyethyl methacrylate) (85/10/5)

L-42 Poly(2-Ethylhexyl acrylate-co-2-Acrylamido-2-methylpropane sulfonic acid-co-2-Acetoacetoxyethyl methacrylate) (85/10/5)

L-43 Poly(n-Butyl acrylate-co-N-Isopropylacrylamide-co-2-Acrylamido-2-methylpropane sulfonic acid) (80/10/10)

L-44 Poly(n-Butyl methacrylate-co-2-Acrylamido-2-methylpropane sulfonic acid-co-2-Acetoacetoxyethyl methacrylate-co-Divinyl benzene) (85/10/4/1)

L-45 Poly(n-Butyl methacrylate-co-Methyl methacrylate-co-2-Acrylamido-2-methylpropane sulfonic acid-co-2-Acetoacetoxyethyl methacrylate) (70/15/10/5)

L-46 Poly(n-Butyl acrylate-co-n-Butyl methacrylate-co-Styrene-co-2-Acrylamido-2-methylpropane sulfonic acid) (10/10/70/10)

L-47 Poly(n-Butyl acrylate-co-Methyl acrylate-co-2-Acrylamido-2-methylpropane sulfonic acid-co-2-Acetoacetoxyethyl methacrylate) (45/40/10/5)

L-48 Poly(n-Butyl acrylate-co-Methyl methacrylate-co-2-Acrylamido-2-methylpropane sulfonic acid-co-2-Acetoacetoxyethyl methacrylate) (75/10/10/5)

L-49 Poly(n-Butyl acrylate-co-Acrylamide-co-Styrene-co-2-Acrylamido-2-methylpropane sulfonic acid) (20/30/45/5)

L-50 Poly(n-Butyl acrylate-co-2-Acrylamido-2-methylpropane sulfonic acid-co-2-acetoacetoxyethyl methacrylate) (85/10/5)

L-51 Poly(n-Butyl acrylate-co-2-Acetoacetoxyethyl methacrylate-co-2-Acrylamido-2-methylpropane sulfonic acid) (40/50/10)

L-52 Poly(2-Acetoacetoxyethyl methacrylate-co-n-Butyl acrylate-co-2-Acrylamido-2-methylpropane sulfonic acid) (60/30/10)

L-53 Poly(n-Butyl acrylate-co-2-Acetoacetoxyethyl methacrylate-co-2-Acrylamido-2-methylpropane sulfonic acid) (50/40/10)

L-54 Poly(Ethyl acrylate-co-2-Acrylamido-2-methylpropane sulfonic acid-co-2-Acetoacetoxyethyl methacrylate) (85/10/5)

L-55 Poly(Methyl acrylate-co-2-Acrylamido-2-methylpropane sulfonic acid-co-2-Acetoacetoxyethyl methacrylate) (85/10/5)

L-56 Poly(sec-Butyl acrylate-co-3-Methacryloyloxy propane-1-methyl-1-sulfonic acid, sodium salt-co-2-Acetoacetoxyethyl methacrylate) (85/10/5)

L-57 Poly(n-Butyl methacrylate-co-3-Methacryloyloxypropane-1-methyl-1-sulfonic acid, sodium salt-co-2-Acetoacetoxyethyl methacrylate) (85/10/5)

L-58 Poly(n-Butyl methacrylate-co-3-Methacryloyloxypropane-1-methyl-1-sulfonic acid, sodium salt-co-Methyl methacrylate-co-2-Acetoacetoxyethyl methacrylate) (70/15/10/5)

L-59 Poly(n-Butyl acrylate-co-3-Methacryloyloxypropane-1-methyl-1-sulfonic acid, sodium salt-co-2-Acetoacetoxyethyl methacrylate) (85/10/5)

L-60 Poly[Styrene-co-2-(Methacryloyloxy)ethyltrimethylammonium methosulfate] (90/10)

L-61 Poly[n-Butyl methacrylate-co-2-(Methacryloyloxy)ethyltrimethylammonium methosulfate] (90/10)

L-62 Poly[n-Butyl acrylate-co-Styrene-co-2-(Methacryloyloxy)ethyltrimethylammonium methosulfate] (30/55/15)

L-63 Poly[Vinylidene chloride-co-Styrene-co-2(Methacryloyloxy)ethyltrimethylammonium methosulfate] (50/45/5)

L-64 Poly[n-Butyl acrylate-co-Vinylidene chloride-co-2-(methacryloyloxy)ethyltrimethylammonium methosulfate] (50/45/5)

L-65 Poly[n-Butyl acrylate-co-2-(Methacryloyloxy)ethyltrimethylammonium methosulfate-co-2-Acrylamido-2-methylpropane sulfonic acid] (80/15/5)

L-66 Poly[n-Butyl methacrylate-co-2-(Methacryloyloxy)ethyltrimethylammonium methosulfate-co-2-Acrylamido-2-methylpropane sulfonic acid] (80/15/5)

L-67 Poly[Methyl methacrylate-co-2-(Methacryloyloxy)ethyltrimethylammonium methosulfate-co-2-Acrylamido-2-methylpropane sulfonic acid] (80/15/5)

L-68 Poly[Ethyl acrylate-co-2-(Methacryloyloxy)ethyltrimethylammonium methosulfate-co-2-Acrylamido-2-methylpropane sulfonic acid] (80/15/5)

L-69 Poly[Styrene-co-2-(Methacryloyloxy)ethyltrimethylammonium methosulfate-co-2-Acrylamido-2-methylpropane sulfonic acid] (80/15/5)

L-70 Poly[n-Butyl methacrylate-co-Styrene-co-2-(Methacryloyloxy)ethyltrimethylammonium methosulfate-co-2-Acrylamido-2-methylpropane sulfonic acid] (40/40/15/5)

L-71 Poly[n-Butyl acrylate-co-Styrene-co-2-(Methacryloyloxy)ethyltrimethylammonium methosulfate-co-2-Acrylamido-2-methylpropane sulfonic acid] (40/40/15/5)

L-72 Poly[Ethyl acrylate-co-Styrene-co-2-(Methacryloyloxy)ethyltrimethylammonium methosulfate-co-2-Acrylamido-2-methylpropane sulfonic acid] (40/40/15/5)

L-73 Poly[n-Butyl methacrylate-co-2-(Methacryloyloxy)ethyltrimethylammonium methosulfate-co-2-Acrylamido-2-methylpropane sulfonic acid] (85/10/5)

L-74 Poly[Ethyl acrylate-co-2-(Methacryloyloxy)ethyltrimethylammonium methosulfate-co-2-Acrylamido-2-methylpropane sulfonic acid] (85/10/5)

L-75 Poly(n-Butyl acrylate-co-p-Styrene sulfonic acid, potassium salt) (95/5)

L-76 Poly(n-Butyl acrylate-co-2-Acrylamido-2-methylpropane sulfonic acid-co-2-Hydroxyethyl methacrylate) (75/20/5)

L-77 Poly(n-Butyl methacrylate-co-p-Styrene sulfonic acid, potassium salt) (95/5)

The ratios shown in parenthesis are weight ratios of the repeating units corresponding to their order of recitation.

From the foregoing description is it evident that many combinations of monomers can be used in the manufacture of aqueous latexes which are loadable in accordance with this invention. It must be pointed out, however, that many polymeric latexes are not "loadable latexes" as that term is defined above. While all of the aqueous latexes formed using the preferred class of polymers to form the polymer particles as described above are loadable in accordance with my process it is recommended that as a precaution before a given latex of any composition is assumed to be loadable according to this process it be tested via the procedure set forth above under the heading "Loadable Polymer Particle Test". In addition to identifying aqueous latexes containing loadable polymer particles which fall outside of the preferred class of loadable polymers described above, the use of this test is also advantageous as a control technique, since batch-to-batch variances in the commercial manufacture of polymeric latexes sometimes occur.

Hydrophobic Compounds

To be considered a hydrophobic compound (or, more succinctly, a hydrophobe) as that term is employed herein the compound must be essentially insoluble in distilled water at 25° C. Preferably the dissolved concentration of hydrophobe in water under these conditions should be less than 0.5 percent by weight, based on the weight of the water. Any such hydrophobe can be employed in the practice of my process which is or can be dissolved in a liquid consisting of one or a mixture of water-miscible organic solvents. Preferably the hydroprobe must be soluble in a concentration of at least 5 percent by weight, based on the total weight of the water-miscible organic solvent and dissolved hydrophobe. In practice minor amounts of essentially diluent materials, such as minor amounts of water commonly entrained in water-miscible solvents, can be associated with the blended hydrophobe and water-miscible organic solvent; however, the hydrophobe and water-miscible organic solvent or solvents are preferably chosen so that additional materials, such as pH or other modifiers—e.g., acid or alkali- are not required to dissolve the hydrophobe. Where commercially available as such, solutions of hydrophobes dissolved in water-miscible organic solvents can be employed as starting materials in the practice of my process.

Although the identity of any particular hydrophobe meeting the requirements indicated above is not important with respect to the successful practice of the generic aspects of the present process, I have discovered that the use of certain classes or types of hydrophobes result in products having unexpectedly valuable utility. Certain preferred embodiments of my invention then can result from specific choices of hydrophobes. For example, useful hydrophobes can include hydrophobic insecticides, herbicides, miticides, hormones, vitamins, enzymes and the like (which meet the requirements set out above). It will be appreciated that the end use of such loaded polymeric latexes may not involve a support. In other applications coating may ultimately be undertaken by the end user rather than by the manufacturer. For example, the present process is useful in the manufacture of latex-type surface coating compositions such as "latex" paints, for example. Other uses for some of the loaded latex compositions of this invention will be discussed hereinafter. Still other uses will become evident from this disclosure.

Examples of some of the useful loaded latex compositions of the present invention include compositions which comprise a preferred loadable polymer latex, as described above, the particles of which contain (uniformly distributed therethrough) one or more hydrophobic materials, as described above. Generally the amount of hydrophobe which can be present in intimate association with the polymer particles of the latex can be anywhere within the range of from 1:40 to 3:1 in terms of a weight ratio of hydrophobe to loadable polymer. It is preferred that the weight ratio of hydrophobe to loadable polymer in the latex be from about 1:10 to 2:1, optimally from about 1:3 to 1:1.

Loading Procedures

The starting materials for the practice of my process are (1) an aqueous latex consisting essentially of water as a continuous phase and loadable polymer particles as a dispersed phase and (2) a water-miscible organic solvent having a hydrophobe dissolved therein. As previously indicated, the aqueous latex contains at least 2 percent by weight, based on total weight, of loadable polymer particles, preferably from about 10 to 20 percent by weight loadable polymer particles, based on total weight. The hydrophobe is dissolved in the water-miscible organic solvent in a concentration in the range of from 0.1 to 20 percent by weight, based on total weight, preferably 2 to 20 percent by weight, based on total weight.

The first step of my process is to blend the above starting materials so that a resulting composition in which the hydrophobe remains in solution and the polymer particles remain dispersed as in the starting aqueous latex. The object is to achieve blending with the hydrophobe remaining dissolved and the latex polymer particles remaining dispersed. This will allow an intimate association of the polymer particles to be loaded with the hydrophobe. Any blending technique which will achieve this desired result can be employed in the practice of my process. There are many different parameters which will contribute to successful blending without coagulation of the hydroprobe or polymer particles. For example, increasing the rate of stirring during blending generally decreases the tendency of either the hydrophobe or polymer particles to coagulate. Increasing the temperature of the starting materials also tends to reduce any tendency toward coagulation. Increasing the proportion of water tends to increase any tendency of the hydrophobe to coagulate, but reduces any tendency of the polymer particles to coagulate. On the other hand, using a higher proportion of water-miscible organic solvent can have the effect of increasing any tendency of the polymer particles to coagulate while reducing any tendency of the hydrophobe to coagulate. It is generally desirable to avoid even incipient coagulation, since once coagulation of either the hydrophobe or polymer particles begins substantially all of the coagulating material will separate out as a precipitate. Techniques for avoiding precipitation when blending materials are, of course, generally well understood by those skilled in the chemical arts.

A preferred technique for blending is to stir rapidly or otherwise produce turbulence in the above-miscible organic solvent containing dissolved hydrophobe. The aqueous latex containing the dispersed polymer particles is then added to the water-miscible organic solvent at a limited rate. The rate of addition of the aqueous latex is controlled so that the volume of aqueous latex added per second to the water-miscible organic solvent containing dissolved hydrophobe is less than 20% of the initial volume of the water-miscible organic solvent with dissolved hydrophobe, preferably less than 10%. Reversing the order of addition so that the water-miscible organic solvent containing hydrophobe is gradually added to the aqueous latex results in coagulation. If the reverse order of addition is contemplated, avoiding coagulation requires a high rate of blending so that the hydrophobe at all times is in a liquid phase which contains a solubility increasing amount of water-miscible organic solvent. Substantially instantaneous blending of the aqueous latex and water-miscible organic solvent with dissolved hydrophobe while maintaining both in a highly turbulent state would be an ideal approach to achieving reverse order blending without coagulation.

During blending the dispersed polymer particles of the aqueous latex and the dissolved hydrophobe are brought into intimate contact. The loadable polymer particles act as a competing solvent for the hydrophobe so that a portion of the hydrophobe is loaded into the polymer particles. As the proportion of water is increased in the liquid phase of the composition the equilibrium distribution of the hydrophobe between the polymer particles and the liquid phase is driven or shifted toward the polymer particles. In other words, as the hydrophilic character of the liquid phase increases, the solubility of the hydrophobe therein is reduced and the solubility of the hydrophobe in the polymer particles is, by comparison, increased.

Generally the proportion of aqueous latex added to the water-miscible organic solvent containing hydrophobe is maintained in the volume ratio of 1:4 to 4:1, preferably 1:2 to 2:1. Not all of the water added, however, need be present in the aqueous latex. It is contemplated that a portion of the water which might be blended in the aqueous latex can be added subsequent to blending the aqueous latex and water-miscible organic solvent. This reduces the amount of water being introduced initially while achieving finally the same proportion of water in the resulting composition and the same equilibrium distribution of hydrophobe between the polymer particles and liquid phase. It is also recognized that a portion of the water-miscible organic solvent can be initially present in the aqueous latex to be blended, and that this would have the effect of initially reducing any tendency of the hydrophobe to coagulate. Before blending is undertaken no more than 20% by weight, preferably less than 10% by weight of water or water-miscible organic solvent should be present in the hydrophobe containing water-miscible organic solvent or aqueous latex, respectively.

Dilution of the liquid phase with water beyond the proportions indicated to drive further the equilibrium distribution of the hydrophobe toward the polymer particles would appear attractive in terms of loading, but it is preferred to maintain the proportion of water within the indicated limits where the ultimate use for the loaded polymeric latex composition requires removal of water, as in photographic coating applications.

Upon completion of the blending step a loaded polymeric latex composition is produced in which a substantial fraction of the hydrophobe is dissolved or minutely distributed within the polymer particles. This loaded latex composition can be used for many different applications, even though a substantial proportion of the hydrophobe remains in the liquid phase of the composition rather than being loaded into the polymer particles.

I prefer to further increase the loading of the polymer particles by removing from the loaded polymeric latex composition at least a major portion—i.e. at least about 50 percent—of the water-miscible organic solvent. The removal of the water-miscible organic solvent can be undertaken by any convenient conventional technique. One convenient technique is to evaporate the water-miscible organic solvent at ambient conditions or at elevated temperatures and/or reduced pressures. The removal of the water-miscible organic solvent further increases the hydrophilic or aqueous character of the liquid medium and further drives the equilibrium distribution of the hydrophobe toward to the polymer particles and away from the liquid phase. In this way, additional loading of the polymer particles is achieved. According to a preferred technique the water-miscible organic solvent is selectively removed by distillation with only a small amount of water being removed, usually only near the end of distillation.

Alternative arrangements for removing water-miscible organic solvents can be undertaken and may be particularly attractive where the water-miscible solvent can not be readily separated by evaporation. For example, one separation approach which can be relied upon to remove water-miscible organic solvents and other liquid phase impurities which may be present is ultrafiltration. Ultrafiltration membranes and equipment which can be employed are disclosed in U.S. Pat. Nos. 3,762,135; 3,789,993; 3,824,299; 3,894,166; 3,645,938; 3,592,672; and 3,527,853, among others. Ultrafiltration procedures are discussed by M. C. Porter in *Ultrafiltration of Colloidal Suspensions,* AIChE Symposium Series No. 120, Vol. 68, 21-30 (1972); G. J. Fallick in *Industrial Ultrafiltration,* pp. 29-34, Process Biochemistry, September 1969; R. L. Goldsmith in *Macromolecular Ultrafiltration with Microporous Membranes,* pp 113-120, Ind. Eng. Chem. Fundam, Vol. 10, No. 1, 1971; M. C. Porter and A. S. Michaels in two articles, both tilted *Membrane Ultrafiltration,* pp. 56-64, January, 1971 and pp. 440-445, July, 1971, Chem. Tech. Water will be removed along with the water-miscible organic solvent and other lower molecular weight impurities present. The proportion of water to water-miscible organic solvent will vary, depending upon such parameters as the relative molecular weight and proportion of the water-miscible organic solvent. Water can, of course, be added during or after ultrafiltration to avoid excessive concentration of the latex particles.

The present process for manufacturing loaded latex compositions can be practiced at temperatures ranging from about 0° C. to about 40° C. or more. It is generally preferred to carry out the hydrophobic loading steps of the present process at about 25° C. or higher. It has been observed that in certain circumstances, usually when loadable polymeric latexes which contain relatively harder polymeric particles (i.e., those loadable latexes having relatively higher Tg's), the latex particles can be made more receptive to the hydrophobic material if relatively higher temperature, such as about 30° C. or higher are used during the imbibition step of the present process.

It should be understood that the techniques and materials set out below are intended to be merely illustrative of how to make and use the compositions and processes of this invention.

Manufacture of a Loadable Polymeric Latex

The following is intended to illustrate one method for manufacturing some of the preferred loadable latexes of this invention.

Into a solution of the following:
1 g.—Triton 770*
0.5 g.—potassium peroxydisulfate
0.1 g.—sodium pyrosulfite
*alkylaryl polyether sulfate, sodium salt, surfactant sold by Rohm & Haas Co.

in 200 ml water at a temperature of 95° C. in a polymerization flask were simultaneously blended, over a period of 20 minutes with continuous stirring, a mixture of 85 g. sec-butyl acrylate plus 5 g. 2-acetoacetoxyethyl methacrylate, a mixture of 10 g. of 3-methacryloyloxy-propane-1-sulfonic acid, sodium salt plus 0.15 g. of sodium pyrosulfite, and 100 ml 95° C. water. Stirring was continued for 70 minutes after completion of the addition while the reactants were maintained at a temperature of 95° C. The resulting latex product was cooled and then dialyzed for about 16 hours against flowing distilled water in a conventional dialyzer. The polymer particles formed accounted 9.5 percent by weight of the latex, based on total weight. The latex was "loadable", in accordance with the "Loadable Polymer Particle Test" set out above, By varying the relative amounts of monomeric reactants and water, loadable latexes of varying solids content can be made.

In these Examples, the use of the present process to prepare pesticide-loaded latex compositions is illustrated.

EXAMPLE 1

Methyl Parathion

Fifteen grams of commercial methyl parathion (80% methyl parathion + 20% xylene) were dissolved in 150 ml. acetone. Into this solution, at room temperature, were gradually blended, with continuous stirring, 200 grams of a dilute latex which was prepared by diluting 66 grams of an 18.25% solid loadable polymeric latex with enough water to produce 200 grams of dilute latex. The loadable polymeric latex had been prepared by polymerizing a mixture of 50 parts by weight of n-butyl methacrylate, 40 parts by weight of styrene and 10 parts by weight of 2-acrylamido-2-methyl propane sulfonic acid in accordance with the abovedescribed procedure.

The resulting loaded latex/solvent mixture was then placed in a 2000 ml. flask, in which it was subjected to evacuation for 15 minutes at about 50° C. to remove acetone. The resulting methyl parathion-loaded latex composition was then filtered (no residue was observed) to yield a homogeneous dispersion which was stable and did not visibly settle spontaneously (upon storage at room temperature) for many weeks. The product contained particles which apparently contained polymer and pesticide in a weight ratio of about 1:1.

EXAMPLE 2

Parathion

Part A, above was repeated, using the following materials:
parathion—7.1 g
acetone—150 ml
18% solids latex—45 g
water (for latex)—108 ml The resulting loaded latex had a polymer to pesticide weight ratio of about 8 to 7, respectively. By weight, the parathion content of the loaded latex product was 5.5%. This product could be readily diluted with water for conventional spray application to agricultural plants.

I claim:

1. A composition containing a continuous aqueous phase and loaded polymer particles having an average diameter of from 0.02 to 0.2 micron and consisting essentially of
   (1) a loadable polymer consisting essentially of
      (a) repeating units forming from 60 to 95 percent by weight of the polyumer derived from at least one of
         (i) acrylate esters having the formula

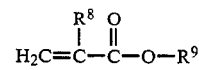

where
$R^8$ is hydrogen or methyl and
$R^9$ is lower alkyl having from 1 to 5 carbon atoms;
         (ii) styrene-type monomers of the formula

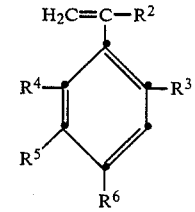

where
$R^2$ is hydrogen or methyl,
$R^3$, $R^4$ and $R^6$ are hydrogen or lower alkyl of from 1 to 5 carbon atoms,
$R^5$ is hydrogen or with $R^4$ constitutes the atoms necessary to complete a fused benzene ring or one of $R^5$ and $R^6$ is halomethyl and
         (iii) vinyl acetate;
      (b) repeating units forming from 5 to 15 percent by weight of the polymer derived from a hydrophilic ethenic monomer having a molecular weight of at most about 300 of the formula

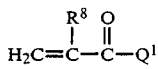

where
R$^8$ is as defined above,
Q$^1$ is —OM or a divalent organic radical which together with the carbonyl group of the formula forms an ester or amido linking group terminating in an ammonium or —SO$_3$M solubilizing group and M is hydrogen, ammonium or alkali metal;
  (c) repeating uinits forming from 0 to 30 percent by weight of the polymer derived from an acrylamide of the formula

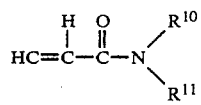

R$^{10}$ and R$^{11}$ are hydrogen or an alkyl or haloalkyl subtituent having from 1 to 5 carbon atoms;
  (d) repeating units forming from 0 to 10 percent by weight of the polymer derived from active methylene containing ethenic monomer exhibiting the formula

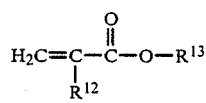

R$^{12}$ is hydrogen, alkyl having from 1 to 12 carbon atoms or

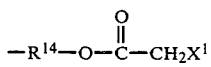

R$^{13}$ is alkyl having from 1 to 10 carbon atoms, cycloalkyl having from 3 to 10 carbon atoms, phenyl or

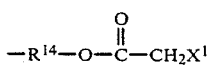

R$^{14}$ is alkylene having from 1 to 10 carbon atoms and X$^1$ is cyano or alkylcarbonyl having from 1 to 8 carbon atoms,
provided that one and only one of R$^{12}$ and R$^{13}$ is always

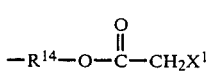

(e) repeating units forming from 0 to 3 percent by weight of the polymer derived from a crosslinking monomer having a olecular weight of at most about 300 and having at least two independently polymerizable vinyl groups; and
(2) loaded into and distributed through said particles, a hydrophobic pesticide having a solubility in distilled water at 25° C. of less than 0.5 percent and capable of being dissolved in a water-miscible organic solvent, the weight ratio of the hydrophobic pesticide to said loadable polymer being from 1:3 to 1:1.

2. A composition according to claim 1 wherein the repeating units derived from active methylene containing ethenic monomer forms from 0.2 to 10 percent by weight of the polymer.

3. A composition according to claim 1 wherein the repeating units derived from a crosslinking monomer form from 0.2 to 3 percent by weight of the polymer.

4. A composition according to claim 1 wherein the polymer consists essentially of repeating units derived from (a) lower alkyl acrylate esters, lower alkyl methacrylate esters or mixtures thereof and (b) repeating units derived from at least one of (i) 2-(methacryloyloxy)ethyltrimethylammonium methosulfate and (ii) 2-acrylamido-2-methylpropane sulfonic acid or its hydrolyzable salt.

5. A composition according to claim 1 wherein the polymer consists essentially of repeating units derived from (a) lower alkyl acrylate esters, lower alkyl methacrylate esters or mixtures thereof, (b) repeating units derived from at least one or (i) 2-(methacryloyloxy)ethyltrimethylammonium methosulfate and (ii) 2-acrylamido-2-methylpropane sulfonic acid or its hydrolyzable salt and (c) repeating units derived from styrene.

6. A composition according to claim 1 wherein the polymer consists essentially of repeating units derived from (a) lower alkyl acrylate esters, lower alkyl methacrylate esters or mixtures thereof, (b) repeating units derived from at least one of (i) 2-(methacryloyloxy)ethyltrimethylammonium methosulfate and (ii) 2-acrylamido-2-methylpropane sulfonic acid or its hydrolyzable salt and (c) repeating units derived from 2-acetoacetoxyethyl methacrylate.

7. A composition containing a continuous aqueous phase and loaded polymer particles having an average diameter of from 0.02 to 0.2 micron and consisting essentially of
  (1) a loadable polymer consisting essentially of
    (a) repeating units forming from 60 to 95 percent by weight of the polymer derived from at least one of
      (i) acrylate esters having the formula

where
R$^6$ is hydrogen or methyl and
R$^9$ is lower alkyl having from 1 to 5 carbon atoms;
      (ii) styrene-type monomers of the formula

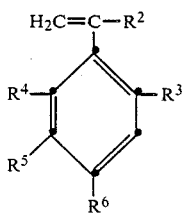

where
R$^2$ is hydrogen or methyl,
R$^3$, R$^4$ and R$^6$ are hydrogen or lower alkyl of from 1 to 5 carbon atoms, $R^5$ is hydrogen or with $R^4$ constitutes the atoms necessary to complete a fused benzene ring or one of $R^5$ and $R^6$ is halomethyl and
   (iii) vinyl acetate;
(b) repeating units forming from 0 to 25 percent by weight of the polymer derived from a hydrophilic ethenic monomer having a molecular weight of at most about 300 of the formula

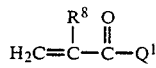

where
   $R^8$ is as defined above,
   $Q^1$ is —OM or a divalent organic radical which together with the carbonyl group of the formula forms an ester or amido linking group terminating in an ammonium or —SO$_3$M solubilizing group and
   M is hydrogen, ammonium or alkali metal;
(c) repeating units forming from 0 to 30 percent by weight of the polymer derived from an acrylamide of the formula

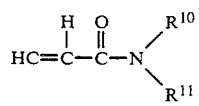

$R^{10}$ and $R^{11}$ are hydrogen or an alkyl or haloalkyl substituent having from 1 to 5 carbon atoms;
(d) repeating units forming from 0 to 10 percent by weight of the polymer derived from active methylene containing ethenic monomer exhibiting the formula

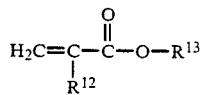

$R^{12}$ is hydrogen, alkyl having from 1 to 12 carbon atoms or

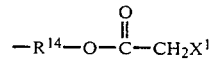

$R^{13}$ is alkyl having from 1 to 10 carbon atoms, cycloalkyl having from 3 to 10 carbon atoms, phenyl or

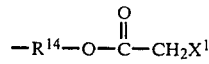

$R^{14}$ is alkylene having from 1 to 10 carbon atoms and $X^1$ is cyano or alkylcarbonyl having from 1 to 8 carbon atoms, provided that one and one one of $R^{12}$ and $R^{13}$ is always

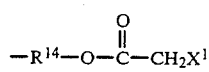

(e) repeating units forming from 0 to 3 percent by weight of the polymer derived from a crosslinking monomer having a olecular weight of at most about 300 and having at least two independently polymerizable vinyl groups; and
(2) loaded into and distributed through said particles, a hydrophobic insecticide having a solubility in distilled water at 25° C. of less than 0.5 percent and capable of being dissolved in a water-miscible organic solvent, the weight ratio of said insecticide to said loadable polymer being from 1:3 to 1:1.

8. A composition according to claim 7 wherein the loaded polymer particles have an average diameter in the range of from 0.02 to 0.08 micron.

9. A composition according to claim 8 wherein said insecticide is a parathion.

10. A composition according to claim 7 in which said polymer particles consist essentially of a loadable copolymer of n-butyl methacrylate, styrene, and 2-acrylamido-2-methyl propane sulfonic acid and parathion or methyl parathion insecticide.

* * * * *